(12) United States Patent
Gilhousen et al.

(10) Patent No.: US 6,421,540 B1
(45) Date of Patent: Jul. 16, 2002

(54) METHOD AND APPARATUS FOR MAXIMIZING STANDBY TIME USING A QUICK PAGING CHANNEL

(75) Inventors: Klein S. Gilhousen, Bozeman, MT (US); Brian K. Butler, La Jolla, CA (US); Paul E. Bender, San Diego, CA (US); Avneesh Agrawal, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/252,846

(22) Filed: Feb. 19, 1999

Related U.S. Application Data (63) Continuation-in-part of application No. 08/890,355, filed on Jul. 9, 1997, which is a continuation-in-part of application No. 08/865,650, filed on May 30, 1997, now Pat. No. 6,111,865.
(60) Provisional application No. 60/075,211, filed on Feb. 19, 1998.

(51) Int. Cl.[7] .................................................. H04Q 7/20
(52) U.S. Cl. ........................ 455/458; 455/459; 370/335
(58) Field of Search ................................. 455/458, 459, 455/31.3, 38.1, 434, 425, 450, 451, 452, 455, 509, 9, 464, 511, 62, 515; 370/335, 365, 322, 337, 311, 336, 342, 333, 329, 461, 462; 340/7.2, 7.33, 7.42

(56) References Cited

U.S. PATENT DOCUMENTS

| | | | | |
|---|---|---|---|---|
| 5,136,614 A | * | 8/1992 | Hiramatsu et al. | 375/141 |
| 5,485,463 A | * | 1/1996 | Godoroja | 370/333 |
| 5,640,395 A | * | 6/1997 | Hamalainen et al. | 370/322 |
| 6,041,241 A | * | 3/2000 | Willey | 455/574 |
| 6,104,333 A | * | 8/2000 | Wood, Jr. | 340/505 |
| 6,111,865 A | * | 8/2000 | Butler et al. | 370/335 |
| 6,138,034 A | * | 10/2000 | Willey | 455/522 |
| 6,157,815 A | * | 10/2000 | Collins et al. | 455/38.1 |
| 6,307,846 B1 | * | 10/2001 | Willey | 370/329 |

FOREIGN PATENT DOCUMENTS

| | | |
|---|---|---|
| EP | 0629095 | 12/1994 |
| EP | 0681406 | 11/1995 |
| EP | 0687078 | 12/1995 |
| GB | 2300337 | 6/1996 |
| WO | 9512934 | 5/1995 |
| WO | 9610895 | 4/1996 |

* cited by examiner

Primary Examiner—Dwayne Bost
Assistant Examiner—Jean A. Gelin
(74) Attorney, Agent, or Firm—Phiip Wadsworth; Kent D. Baker; S. Hossain Beladi (57) ABSTRACT

A quick paging system having a base station, a plurality of terminals, and a full paging channel having a plurality of slots for transmitting paging information to the terminals is described. A quick paging channel having a plurality of quick paging channel slots each corresponding to a full paging channel slot is provided wherein at least one indicator is positioned within a selected quick paging channel slot that instructs at least one selected terminal corresponding to the at least one indicator in the quick paging slot to monitor the corresponding full paging channel slot.

26 Claims, 6 Drawing Sheets

METHOD AND APPARATUS FOR MAXIMIZING STANDBY TIME USING A QUICK PAGING CHANNEL

This is a continuation-in-part of U.S. patent application Ser. No. 08/890,355 filed Jul. 9, 1997 entitled "Dual Event Slotted Paging", which is a continuation-in-part of U.S. patent application Ser. No. 08/865,355 filed May 30, 1997, now U.S. Pat. No. 6,111,865 and a prov. of No. 60/075,211, filed Feb. 19, 1998 also of the same title.

BACKGROUND OF THE INVENTION

I. Field of the Invention

The present invention relates to wireless telecommunication systems. More particularly, the present invention relates to a novel and improved method and apparatus for paging a cellular telephone or other wireless communication device using a quick paging channel and a full paging channel.

II. Description of the Related Art

The IS-95 cellular telephone standard and its derivatives such as IS-95A and ANSI J-STD-008, referred to herein collectively as IS-95, use advanced signal processing techniques to provide efficient and high quality cellular telephone service. For example, an IS-95 compliant cellular telephone system utilizes decoding, error detection, forward error correction (FER), interleaving and spread spectrum modulation in order to make more efficient use of the available RF bandwidth, and to provide more robust connections. In general, the benefits provided by IS-95 include longer talk time and fewer dropped calls when compared to other types of cellular telephone systems.

To conduct communications in an orderly manner, the IS-95 standard provides a set of highly encoded channels over which data having different functions is transmitted. These highly encoded channels include a paging channel carrying paging messages for notifying cellular telephones or other types of wireless terminals that an incoming request to communicate is pending. In accordance with the IS-95 standard, paging messages are transmitted at low to medium data rates during time slots that are preassigned to groups of cellular telephones. These paging channel time slots are typically eighty milliseconds in duration. Each eighty millisecond time slot is composed of four paging channel message frames each twenty milliseconds in duration. Table I provides the data included in a General Page Message as an example of a typical paging message generated substantially in accordance with the IS-95A standard.

TABLE I

General Page Message

| Field | Length (Bits) |
| --- | --- |
| MSG_TYPE ('00010001') | 8 |
| CONFIG_MSG_SEQ | 6 |
| ACC MSG_SEQ | 6 |
| CLASS_0_DONE | 1 |
| RESERVED | 2 |
| BROADCAST_DONE | 1 |
| RESERVED | 4 |
| ADD_LENGTH | 3 |
| ADD_PFIELD | 8 × ADD_LENGTH |
| Zero or more occurrences of the following page record: | |
| PAGE_CLASS | 2 |
| PAGE_SUBCLASS | 2 |
| Page class specific fields | |

TABLE I-continued

General Page Message

| Field | Length (Bits) |
| --- | --- |
| ADD_PFIELD | 8 × ADD_LENGTH |
| RESERVED | 0–7 (as needed) |

In the general page message, the MSG_TYPE field corresponds to the message type and is set to '00010001'; the CONFIG_MSG_SEQ field corresponds to a configuration message sequence number that is set to CONFIG_SEQ as specified in section 7.6.2.2 of IS-95A; the ACC_MSG_SEQ field corresponds to an access parameters message sequence number that is set to ACC_CONFIG_SEQ as specified in section 7.6.2.2 of IS-95A; the CLASS_0_DONE field indicates whether Class 0 pages (as described in IS-95A) are done; the CLASS_1_DONE field indicates whether Class 1 pages (as described in IS-95A) are done; the first RESERVED field includes reserved bits that are set to '00'; the BROADCAST_DONE field indicates whether broadcast pages are done; the second RESERVED field includes reserved bits that are set to '0000'; the ADD_LENGTH field indicates the number of octets in the page message specific fields; and the ADD_PFIELD is used for any additional page message specific fields. The base station includes one occurrence of the appropriate page class record for each mobile station which is paged in the message. Page records with the PAGE_CLASS set equal to '11' and PAGE_SUBCLASS set equal to '00' are used to announce broadcast messages sent on the paging channel.

In order to detect paging messages, a cellular telephone periodically monitors the paging channel during the assigned paging slot. Furthermore, the cellular telephone periodically activates RF and digital signal processing circuitry for as long as necessary to process the paging message. Since. the typical paging message is relatively long, possibly extending over several paging channel frames, and transmitted by way of a highly encoded low to medium rate channel, the associated processing during each paging slot requires a significant amount time and signal processing resources.

Quite often instances occur the cellular telephone is assigned to monitor predetermined paging channel slots where is no paging message intended for the particular mobile station. Accordingly, the mobile station has consumed battery power in the signal processing of information for the duration of the slot where either the message is not intended for the mobile station or there is no message. This unnecessary processing reduces the amount of time an IS-95 compatible cellular telephone can remain in a standby mode without depleting its battery. It would be desirable to provide a system which increased the amount of time that a telephone could remain in standby mode while, at the same time, ensuring that all pages sent to the telephone are correctly received.

Paging schemes disclosed in U.S. patent application Ser. No. 08/890,355 filed Jul. 9, 1997 entitled "Dual Event Slotted Paging", and in U.S. patent application Ser. No. 08/865,650 filed May 30, 1997, now U.S. Pat. No. 6,111,865, which are incorporated by reference herein, illustrate the basic implementation of a full paging channel in combination with a quick paging channel to provide terminal paging.

SUMMARY OF THE INVENTION

The present invention is directed to a mobile radio communication system that includes a base station, a plurality of terminals, a full paging channel with paging slots for transmitting paging information to the terminals, and a quick paging channel containing terminal specific paging indicators. The indicators provided within a quick paging slot instruct specific terminals to monitor the paging channel.

The present invention also includes a method for determining paging information from a pilot signal received by way of a pilot channel. In this method, a pilot signal value is determined from the received pilot signal, and the paging information is then determined according to the pilot signal value. The system optionally includes an on-off keying signal within the quick paging channel to instruct a terminal to monitor the paging channel.

A telephone paging system in accordance with the present invention can also include information packets within the quick paging channel. The information packets are associated with terminals and function to instruct the associated terminals to monitor the paging channel. Reserved information packets are provided to instruct a plurality of terminals to perform telephone operations and to instruct a plurality of terminals not to perform telephone operations. The information packets can have a bit for indicating that a subsequent information packet has a further bit for instructing a terminal to monitor the paging channel.

The quick paging channel in an exemplary embodiment is an uncoded, on-off keying (OOK) modulated direct sequence spread spectrum signal that is used by mobile stations operating within the coverage areas of base station. The base station uses the quick paging channel to inform mobile stations operating in the slotted mode while in the idle state whether of not they should receive information on a paging channel or other designated channels. The presently disclosed method and apparatus provides enhanced robustness to paging schemes using a slotted mode paging channel and a quick paging channel.

BRIEF DESCRIPTION OF THE DRAWINGS

The features, objects, and advantages of the present invention will become more apparent from the detailed description set forth below when taken in conjunction with the drawings in which like reference characters identify like features correspondingly throughout.

DETAILED DESCRIPTION OF THE PREFERRED EMBODIMENTS

A method and apparatus for minimizing wake-up time of a cellular telephone or other wireless terminal, which monitors a time slotted paging channel for terminal intended messages, to reduce standby mode power consumption is described. The invention is set forth in the context of a direct sequence spread spectrum code division multiple access (CDMA) cellular telephone system operating substantially in accordance with the IS-95 standard and standard-like variants thereof. While the invention is particularly suited for operation in such an environment, many other digital communication systems can benefit from the use of the present invention, including TDMA based wireless communication systems, satellite based communication systems, and wireline systems over which encoded signaling is transmitted.

Figure 1:
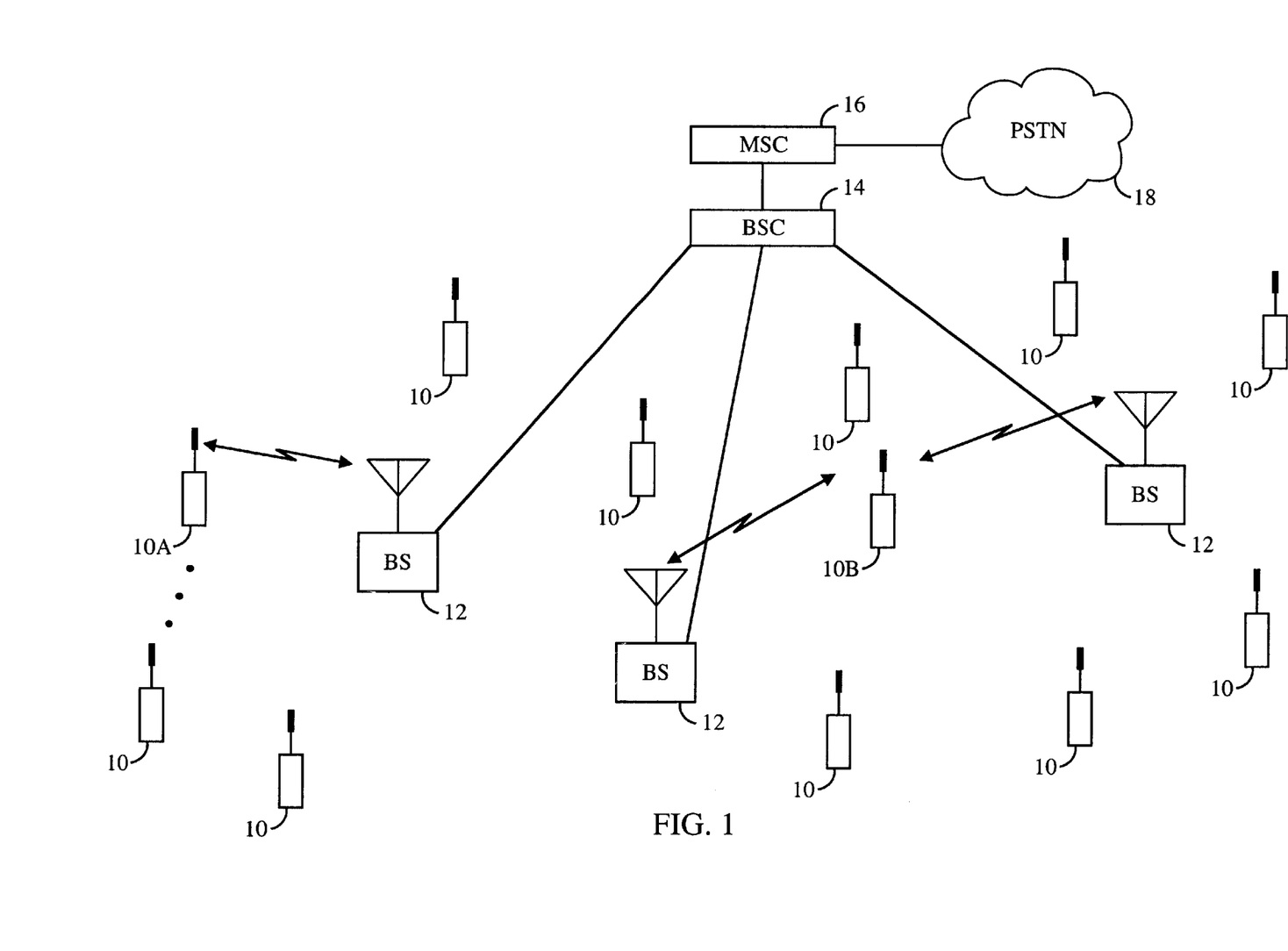
FIG. 1 is a block diagram of a cellular telephone system used for implementing the quick paging system of the present invention.

FIG. 1 is a block diagram of a simplified cellular telephone system that may be used to implement the quick paging system of the present invention. Remote stations such as wireless terminals 10 (typically cellular telephones) are located among base stations 12. The wireless terminals 10a and 10b are in an active mode and are therefore interfacing with one or more base stations 12 using radio frequency (RF) signals modulated in accordance with the CDMA signal processing techniques of the IS-95 standard. A system and method for modulating RF signals in accordance with CDMA modulation is described in U.S. Pat. No. 5,103,459 entitled "System and Method for Generating Signal Waveforms in a CDMA Cellular Telephone System" assigned to the assignee of the present invention and incorporated herein by reference. The other wireless terminals 10 are in standby mode and are therefore monitoring a paging channel for page messages indicating a request to communicate.

In a preferred embodiment, each base station 12 generates forward link signals comprised of a set of forward link channels. The channels are established by a set of orthogonal 64 chip Walsh codes. A Walsh code is used to modulate the data associated with a particular channel. The channels are categorized by function and include a pilot channel over which a phase offset pattern is repeatedly transmitted, a synch channel over which synchronization data is transmitted including the absolute system time and the phase offset of the associated pilot channel, and traffic channels over which the data directed to the terminals 10 is transmitted. The traffic channels are normally assigned to transmit data to a particular wireless terminal 10 for the duration of the interface with that particular base station. It should be understood that other types of codes and code lengths, along with other control channels may be used in like systems.

Additionally, in accordance with one embodiment, one or more of the Walsh channels is designated as a quick paging channel, and one or more of the Walsh channels is designated as a full paging channel. The designation and operation of the full paging channel is preferably performed in accordance with the paging channel specified by the IS-95 standard. Some methods and apparatus for performing paging substantially in accordance with the IS-95 standard are described in U.S. Pat. No. 5,392,287 (the '287 patent) entitled "Apparatus And Method For Reducing Power Consumption In A Mobile Communications Receiver" and U.S. Pat. No. 5,509,015 (the '015 patent) entitled "Method And Apparatus For Scheduling Communications Between Transceivers" both assigned to the assignee of the present invention and incorporated herein by reference.

As described in the '287 and '015 patents, and as specified by the IS-95 standard, the full paging channel is divided into time slots. The time slots are assigned to groups of wireless terminals 10. The assignment is performed based on the international mobile subscriber ID (IMSI) which is unique for each wireless terminal 10, or other terminal identification information such as one or more mobile identification numbers (MIN). In alternative embodiments other identification information may also be used including the electronic serial number (ESN) of the wireless terminal 10 or the temporary mobile subscriber ID (TMSI). The various types of identification information that may be used will be referred to hereinafter collectively as the mobile ID. The quick paging channels are also divided into time slots.

Figure 2:
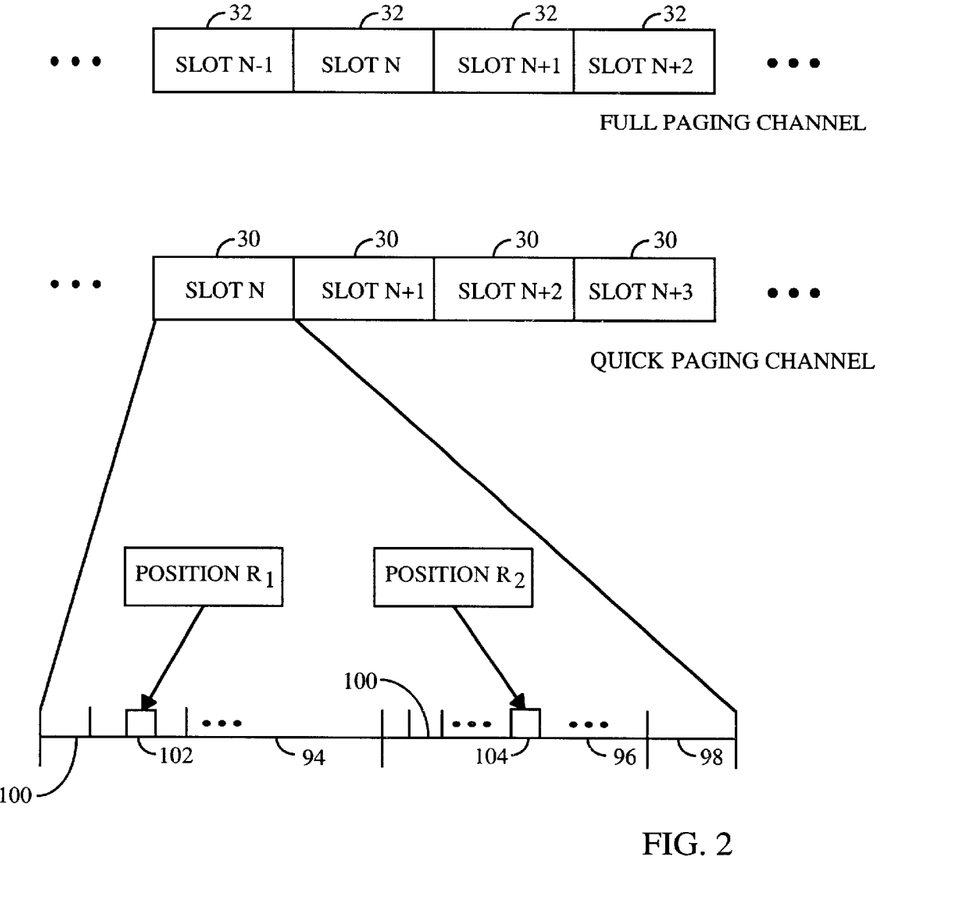
FIG. 2 is a timing diagram illustrating the timing of slots in a quick paging channel and a full paging channel, in accordance with the present invention.

FIG. 2 is a timing diagram illustrating the time slots of a full paging channel and a quick paging channel, in accordance with the present invention. The quick paging channel is divided into quick paging slots 30 and the full paging channel is divided into full paging slots 32 which are preferably longer in duration than the quick paging slots. The quick paging slots 30 are composed of paging indicators corresponding to particular wireless terminals 10. The indicators are preferably generated in accordance with a hashing function to the ID of the wireless terminal 10.

To page a particular wireless terminal 10, a quick page indicator or message is transmitted during the quick paging slot and a full paging message is transmitted during the full paging slot assigned to that wireless terminal 10. The quick paging slot and full paging slots occur in a periodically repeating fashion, which ensures that a slot associated with a particular terminal 10 occurs after sufficient period of time. As illustrated in FIG. 2, each full paging slot 32 is transmitted when the associated quick paging slots 30 are transmitted. Within each quick paging slot 30 the indicators are preferably arranged for transmission to allow the wireless terminal 10 to process the quick paging message and activate additional decoding circuitry before the next full paging slot associated with the wireless terminal occurs.

Figure 3:
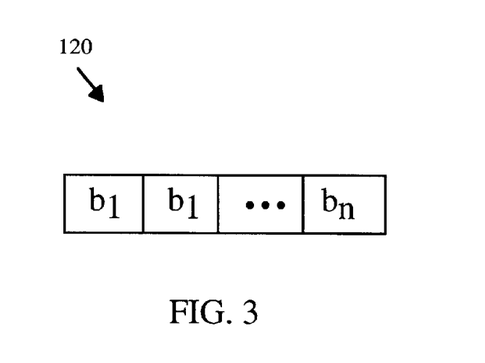
FIG. 3 is a schematic representation of the quick paging packet of the present invention.

FIG. 3 is a timing diagram illustrating a quick paging channel and a full paging channel. The quick paging channel is transmitted preferably using a 64-ary Walsh code. The index of the Walsh code is transmitted on the paging channel. The quick paging channel contains single bit messages to direct slotted-mode wireless terminals 10 to monitor their assigned slot on the paging channel. The quick paging channel data rate is typically 9,600 bps. However, it may operate at either rate 1 (9,600 bps), rate ½ (4,800 bps) or rate ¼ (2,400 bps). The quick paging channel rate is typically specified on the paging channel.

The modulation is on-off keying (OOK), where a logical one instructs wireless terminals 10 to monitor the paging channel a logical zero instructs the wireless terminals 10 to return to the sleep or standby mode. One OOK symbol is transmitted in each 128 PN chip symbol period. A bit is sent using one, two or four symbols, depending on the whether the quick paging channel data rate is 1, ½ or ¼. The transmitted $E_c/I_{or}$ while sending a logical one bit is typically 3 dB below the pilot channel $E_c/I_{or}$.

Each single bit message is transmitted twice per eighty millisecond slot, first starting at symbol position R1, then again starting at symbol position R2, numbering positions from a zero position. The set of possible symbol positions over which the quick paging channel is defined starts eighty milliseconds before the associated slot on the paging channel. This starting point can be defined as time t, where t is in units of frames such that, $$\left\langle \left| \frac{t-4}{4} \right| - PGSLOT \right\rangle_{16T} = 0,$$

where $T=2^t$ is the slot cycle length in units of 1.28 seconds and t is the slot cycle index.

In FIG. 2 the quick paging slots 30 of the quick paging channel are divided into a plurality of subslots 94, 96, 98. Subslots 94, 96 are divided into time positions 100, which may also be referred to as bit or indicator positions. Indicators 102, 104 are transmitted within quick paging slots 30 in a manner similar to the transmission of quick paging messages as previously described. Thus the presence of an indicator such as indicators 102, 104 instructs a wireless terminal 10 assigned to the quick paging slot 30 containing the indicator(s) to monitor the paging channel. The wireless terminal 10 can be instructed to monitor for any paging information that is transmitted to it by way of a channel within the telephone system using indicators 102, 104. It will be understood that a single indicator 102, 104 can be transmitted to signal a quick paging message when practicing the method of the present invention. However, in the preferred embodiment of the invention, two indicators 102, 104 are transmitted, one indicator 102 in subslot 94 and one indicator 104 in subslot 96. Transmitting two indicators 102, 104 rather than one provides increased reliability. Signals in the quick paging channel can be transmitted using conventional Walsh codes. No indicators 102, 104 are located within subslot 98 in order to provide a minimum amount of time between indicators 102, 104 and any paging messages that may be present in the next full paging slot 32. The combined time duration of subslots 94, 96, 98 can be a period lasting eighty milliseconds. Typically subslots 94 and 96 are each thirty-five milliseconds in duration while subslot 98 is typically ten milliseconds. The use of a subslot 98 is to provide time from the transmission of the second indicator 104 for the terminal 10 to prepare to receive the paging channel message. In alternate embodiments the first subslot may be forty miliseconds in duration with each of two subsequent sublsots may be of twenty miliseconds in duration.

Time values are preferably hashed either to one bit $R_1$ or to two bits $R_1$ and $R_2$ per quick paging slot 30. Each hashing operation randomizes the location of one bit indicators 102, 104 over 336, 168 or 84 non-overlapping bit positions, depending on whether the data rate is rate 1 (9,600 bps), ½ (4,800 bps), or ¼ (2,400 bps). Decorrelation values are defined as follows so that they periodically update in order to prevent collisions between wireless terminals 10.

For example:

$$DECORR_1 = \left\langle \left| \frac{t-4}{64} \right| \right\rangle_{2^{16}},$$

$$DECORR_2 = \left\langle \left| \frac{t-4}{64} \right| + 1 \right\rangle_{2^{16}},$$

where t is a unit of time expressed in sequential frames and time starts at the beginning of subslot 94 and runs continuously to the end of subslot 96. The positions $R_1$ and $R_2$ where indicators 102, 104 are located can be determined as follows, where N is the is the number of symbol positions, for example 336 which corresponds to 28 power control groups, L is bits 0–15 of the results of a hash operation performed on MIN or the IMSI and H is bits 16–31 the results of the same hash operation.

$$R_1 = \frac{1}{RATE} \left[ \frac{RATE \cdot N \cdot \langle 40503 \cdot (L \oplus H \oplus DECORR_1) \rangle_{2^{16}}}{2^{16}} \right], \text{ and}$$

-continued $$R_2 = \frac{1}{RATE}\left[\frac{RATE \cdot N \cdot \langle 40503 \cdot (L \oplus H \oplus DECORR_2)\rangle_{2^{16}}}{2^{16}}\right] + N.$$

In the preferred embodiment of the invention, the modulation of indicators 102, 104 within time positions 100 can be performed using on-off keying modulation. In the on-off keying method, wireless terminals 10 are instructed to monitor the quick paging channel for the presence of indicators 102, 104 in selected time positions 100 of a corresponding quick paging slot 30. Wireless terminals 10 monitors the indicator bit(s) such that in certain cases a two indicator bits are used to provide robustness against possible hash value collision and channel induced errors.

An exemplary scheme for monitoring the indicators follows. If the first time position 100 within subslot 94 is a logical zero, then wireless terminal 10 interprets this event for it to remain in a standby mode and not monitor the full paging channel slot. If there is anything other than a logical zero in the first time position 100 within subslot 94, such as a logical one or an erasure, the second time position 100 in subslot 96 is evaluated. For example, a logical one in the first time position 100 within subslot 94 indicates that the second time position 100 in subslot 96 is to be monitored for the presence of indicator 104. If indicators 102, 104 are both ones then wireless terminal 10 monitors the corresponding full paging channel slot. However, if the second indicator 104 is a logical zero then wireless terminal 10 interprets it to remain in a standby mode and not monitor the full paging channel slot. Similarly an erasure in the first time position 100 within subslot 94 also requires wireless terminal 10 to monitor the second time position in subslot 96. If the second indicator 104 is a one then wireless terminal 10 monitors the full paging channel slot, but if is a zero then the paging channel slot is not monitored. However, if both the first and second indicators 102, 104 are erasures, then wireless terminal 10 as a conservative measure monitors the full paging channel slot.

When detecting bits in the quick paging channel and in the full paging channels, wireless terminals 10 can compare the signal level in the channel to a threshold value. Thus, in the preferred embodiment of the invention, each indicator 102, 104 transmitted in a time position 100 can be transmitted at an energy level 3 db below (or one-half) the level of a pilot signal transmitted in the pilot channel of the wireless terminals 10. Since the pilot signal and indicators 102, 104 in the quick paging and full paging channels are subject to substantially similar transmission conditions, the attenuation of the pilot signal is a good estimate of the attention of the paging channels. Thus a level of one half the pilot signal can be used as a threshold value for detecting bits in the other channels such as indicators 102,104.

Thus in order to determine the presence of indicators 102, 104 the level of the pilot signal can be determined and a threshold value can be obtained from this level. However, the reliability of the detection of indicators 102, 104 can optionally be measured by making a further determination based upon the pilot signal level. If a signal such as indicators 102, 104 are determined to be present and the energy level of the pilot channel is above a minimum amount, wireless terminals 10 can be reliably instructed to monitor the full paging channel. However, if the energy level of the pilot channel is below the minimum level, the determined bit value of indicators 102, 104 are erased and the full paging channel is not monitored. Wireless terminal 10 can then perform a search of the next slot 30 associated with the next corresponding paging channel slot for indicators 102, 104. If indicators 102, 104 are determined to be present, another determination is made of the energy level of the pilot signal. If the pilot signal is again determined to be below the minimum level (but above zero), the full paging channel is then monitored.

Referring to FIG. 3, there is shown a quick paging packet 120 in accordance with the present invention. Quick paging packet 120 can be transmitted within slots 30 of a quick paging channel in order to signal wireless terminals 10 to monitor the full paging channel. In this embodiment, the differing possible bit configurations within quick paging packet 120 can be associated with the various wireless terminals 10. Quick paging packet 120 can have n bits and can therefore distinguish $2^n$ wireless terminals 10. In a preferred embodiment, n has a value of nine. In this embodiment, the presence of a selected bit pattern within quick paging packet 120 transmitted by way of the quick paging channel instructs the associated wireless terminal 10 to monitor the full paging channel.

In accordance with a still further embodiment, rather than being associated with a particular wireless terminal 10, one or more of the possible bit patterns of quick paging packet 120 can be reserved for instructing multiple wireless terminals 10 to perform telephone operations. For example, a reserved bit pattern of information packet 120 can instruct all wireless terminals 10 to monitor the full paging channel. In one case a single bit in a reserved position can be used. This can be useful, for example, during configuration of the cellular telephone system. Another reserved pattern within quick paging packet can instruct all wireless terminals 10 not to monitor the full paging channel. Reserved bit patterns within quick paging packet 10 can also be used to signal groups of wireless terminals 10 not to monitor the full paging channel.

Figure 4:
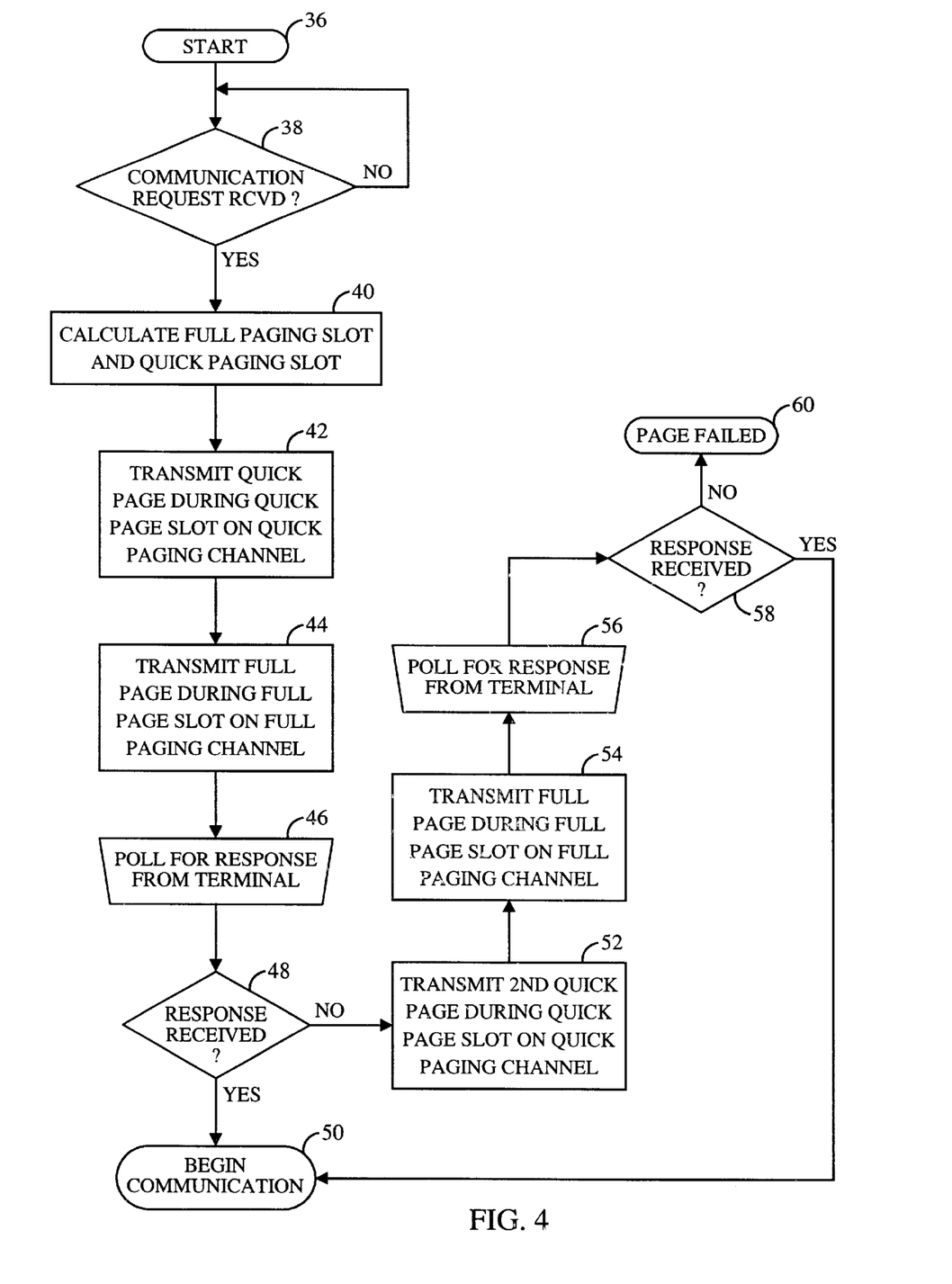
FIG. 4 is a flow diagram illustrating the steps performed during the paging of a wireless terminal, in accordance with the present invention.

FIG. 4 is a block diagram of the steps performed by a base station controller (BSC) 14 during the paging process of the present invention. The paging process begins at step 36 and at step 38 where it is determined whether a request to communicate has been received by the BSC. If a request to communicate has been received, the full paging slot and quick paging slot associated with the wireless terminal 10 to which the communication request is directed are calculated at step 40 based on the mobile ID or other identification information of that wireless terminal 10. BSC 14 preferably performs the necessary processing using one or more microprocessors running software stored in memory (not shown).

The full paging slot is preferably determined in step 40 in accordance with the above referenced '287 and '015 patents, and the quick paging slot is determined by application of a hashing function to the mobile ID, although other methods for assigning paging slots to wireless terminals 10 are consistent with the use of the present invention. If the mobile ID is not contained directly within the request to communicate, it can be obtained via look-up in a database using any other identification information contained in the request such as the telephone number or mobile identification number (MIN) of the wireless terminal 10.

Once the quick paging slot and the full paging slot are determined, BSC 14 directs one or more base stations 12 to transmit a quick paging message at step 42 in the appropriate slot on the quick paging channel and a full paging message at step 44 in the appropriate slot on the full paging channel to an intended recipient wireless terminal 10. The base stations 12 encode and modulate the paging messages and, in step 46, BSC 14 polls for a response from the intended recipient terminal 10. If a response was received (step 48), a communication (e.g., a voice communication session)

begins at step 50 between the recipient terminal 10 and one or base stations 12 in accordance with the parameters included in the full paging message.

If no response was received after a timeout period, the BSC 14 directs one or more base stations 12 to transmit a second quick paging message which is transmitted at step 52 in the appropriate slot on the quick paging channel, and a second full paging message (step 54) in the appropriate slot on the full paging channel to the intended recipient wireless terminal 10. At step 56, the BSC 14 again polls for a response from the wireless terminal 10 and determines at step 58 if a response was received. If a response was received, the communication begins at step 50. If it is determined at step 58 that no response was received, the page fails at step 60. In an alternative embodiment, two quick paging messages and two corresponding full paging messages are generated for each page. The second quick paging message and full paging message increase the likelihood of the page being received, without introducing the delay necessary to determine whether an acknowledgment message has been received from the wireless terminal 10.

In the preferred embodiment of the invention, the quick paging message is comprised of an incoming page bit. An incoming page bit in a first state (such as logic high) in a given quick paging slot indicates that a communication request has been received for the wireless terminal(s) 10 associated with that quick paging slot, and that such wireless terminal(s) 10 should process the full paging channel during the next designated full paging slot associated with such wireless terminal(s) 10. An incoming-page bit in a second state (such as logic low) in a given quick paging slot indicates that no communication request has been received for the wireless terminal(s) 10 associated with that quick paging slot, and therefore the full paging channel should not be processed by such wireless terminal(s) 10 during next full paging slot. Since the page is represented in the quick paging message by a single bit or two bits, rather than a substantially higher number of bits, and the quick paging message can be processed with fewer resources than the full paging message.

In the preferred embodiment of the invention, each full paging message transmitted in the full paging channel contains the information specified in the IS-95 standard for a General Paging Message. An example of a General Paging Message generated in accordance with the IS-95A standard is provided in Table I above. As illustrated by Table I, the General Paging Message contains significantly more information than the quick paging message, which is preferably comprised of a single bit. Therefore, the quick paging message can be processed more easily by each wireless terminal 10, and with less power, than a full paging message.

Figure 5:
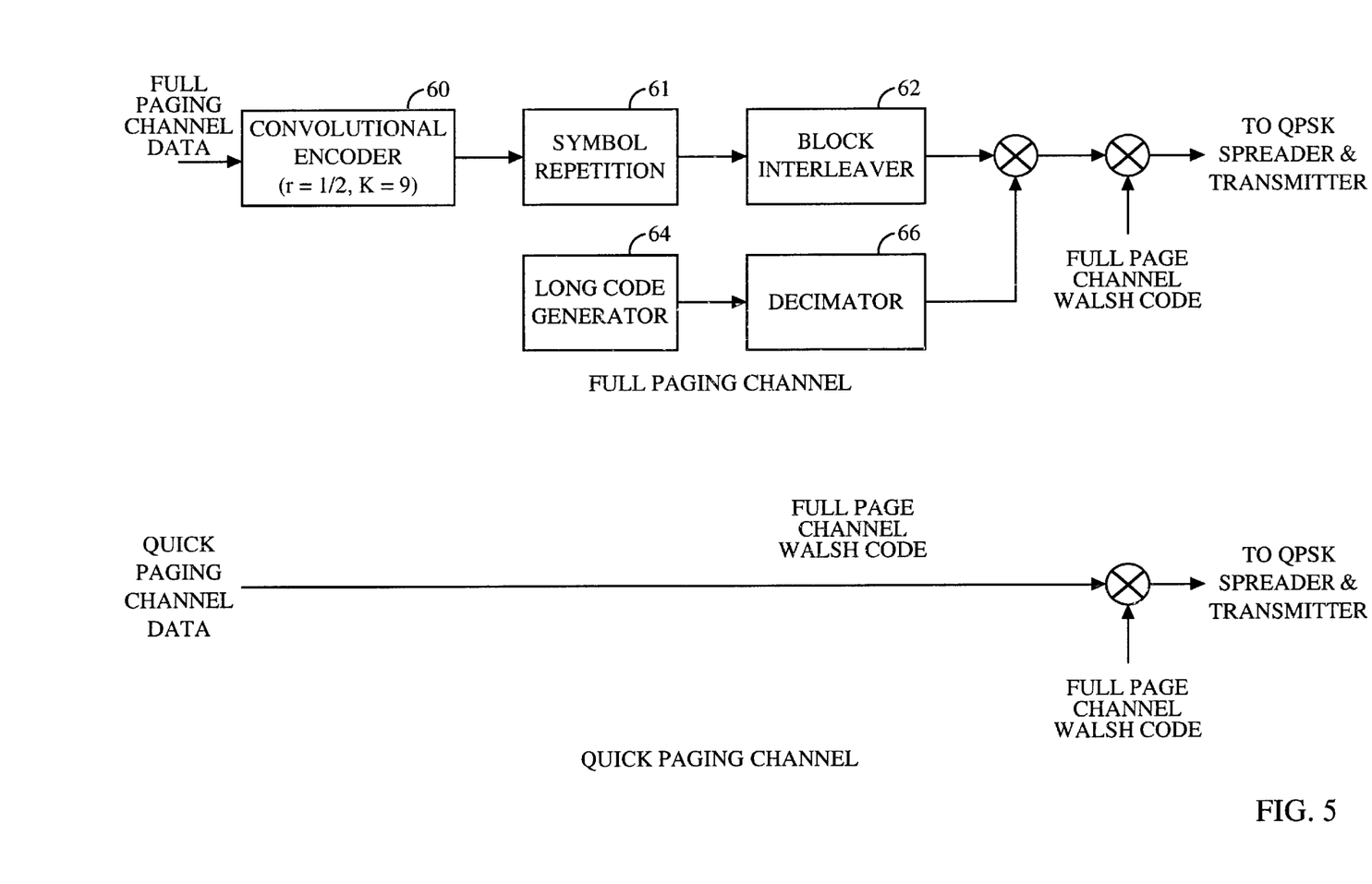
FIG. 5 is a block diagram illustrating coding that is performed on the full paging channel and the quick paging channel, in accordance with the present invention.

In addition to transmitting less information in a quick page message than in a full page message, the preferred embodiment incorporates a minimal coding scheme for the quick paging channel when compared to the full paging channel. FIG. 5 provides an illustration of the coding schemes employed for the full paging channel and the quick paging channel in accordance with one embodiment of the invention. As shown in FIG. 5, data transmitted via the full paging channel is convolutionally encoded by convolutional encoder 60 and the resulting code symbols repeated by symbol repeater 61 in order to generate symbols at a predetermined rate. The repeated code symbols are then block interleaved by block interleaver 62. The data from block interleaver is scrambled using an exclusive-or with a decimated long code generated by long code generator 64 and decimator 66. The long code is a binary code generated in a predetermined manner as a function of a seed number, and is modulated by the same Walsh code. By contrast, the processing associated with transmitting information over the quick paging channel is substantially less than that associated with the full paging channel. Therefore, the amount of processing in the quick paging channel is also substantially less, and therefore requires less energy than that necessary for the full paging channel. In a further embodiment, the quick paging channel could be scrambled using the long code as performed for the full paging channel.

In alternative embodiments of the invention, multi-bit quick page messages are used in the quick paging channel rather than single bit quick paging messages. These multi-bit quick paging messages are used to encode and convey additional information beyond simply indicating that the recipient wireless terminal 10 should monitor the full paging channel during the next assigned full paging slot 32. For example, the multi-bit quick page message could be used to indicate more particularly which wireless terminal 10 is being paged from a subset of wireless terminals 10 assigned to the corresponding quick page slot 30. The multi-bit quick page message could also be used to indicate that the full paging channel should be monitored for a longer duration so that system parameter changes can be broadcast to all the wireless terminals 10. Those skilled in the art will recognize various useful types of information that can be transmitted using a multi-bit quick page message. Also, in another alternative embodiment, reduced forward error correction encoding may be performed using multi-bit quick paging messages transmitted on the quick paging channel.

Figure 6:
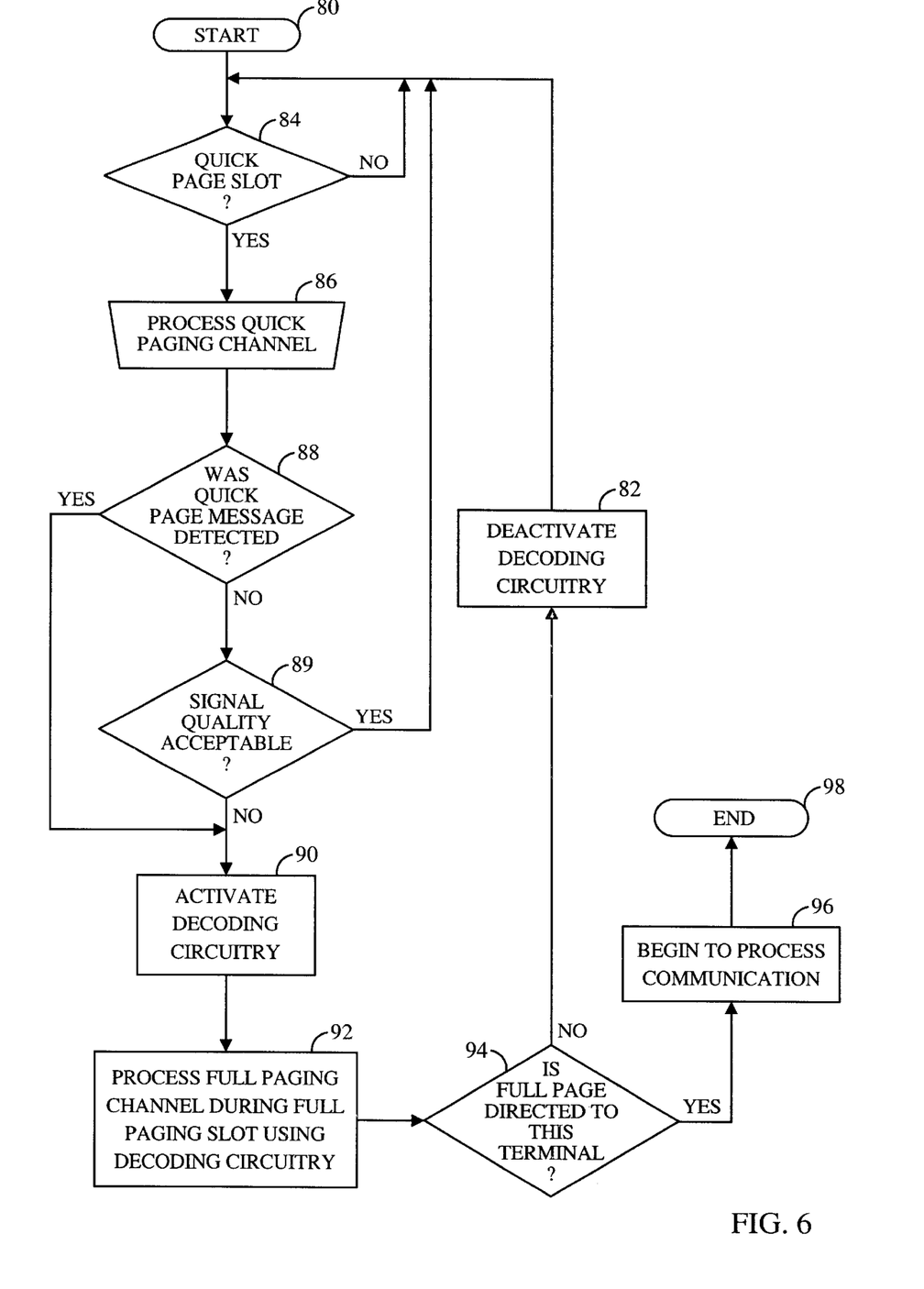
FIG. 6 is a flow diagram illustrating the steps performed by a wireless terminal during standby mode, in accordance with the present invention.

FIG. 6 is a flow diagram of the processing performed by a wireless terminal 10 in standby mode. The processing is preferably performed using a microprocessor controlled by software instructions stored in memory coupled to other integrated circuits and systems that are well known in the art (not shown). The processing begins at step 80 and at step 84, the wireless terminal 10 determines whether a quick page message has arrived in the quick paging slot assigned to the terminal. If a quick page message has arrived in the quick paging slot assigned to the terminal, the wireless terminal 10 processes the quick paging message in the assigned slot at step 86. Preferably, the processing is performed using a significantly smaller subset of the signal processing circuitry contained in the wireless terminal 10 than used to process full page messages. In accordance with the transmit processing performed for the quick paging channel shown in FIG. 5, the receive processing circuitry for the quick paging channel is preferably comprised of circuitry for down conversion of the RF energy received and demodulation of the received signal with the designated Walsh code. The resulting soft decisions are processed directly to determine the logic level transmitted in the quick paging slot assigned to the terminal.

At step 88, the terminal 10 determines whether a quick page message was received at step 86 based on the logic level of the data detected. If a quick page message was detected processing continues at step 90 as described below. If a quick page message was not detected, it is further determined at step 89 whether the signal quality during the processing of the quick paging channel was acceptable. If so, the wireless terminal 10 returns to step 84. If the signal quality was not acceptable, processing continues at step 90 as described below.

The received signal quality can be determined in step 90 by various well known methods including determining when the receive power of the signal on the quick paging channel fails below a threshold, or by determining when the signalto-noise ratio of a pilot channel falls below a predetermined threshold. By monitoring for a full page message when the received signal quality is unacceptable, the present invention minimizes the number of missed full page messages due to undetected quick page messages resulting from unacceptable signal quality on the quick paging channel.

If a quick page message was detected in step 88, or the received signal quality was not acceptable in step 89, the wireless terminal 10 exits its standby mode by activating additional decoding circuitry at step 90 and, at step 92 processes the full paging channel during the assigned full paging slot using the activated circuitry. The time between the quick paging slot and the full paging slot assigned to a particular terminal must be sufficient to allow activation of the additional decoding circuitry within the wireless terminal 10 after detection of the quick page message before the full page slot occurs.

At step 94, the wireless terminal 10 determines whether the full page message processed at step 92 was directed to it based on the address contained in that message, and if not the decoding circuitry within wireless terminal 10 is deactivated at step 82 (thereby returning the wireless terminal to its standby mode) and step 84 is performed again. If the full page message was directed to the wireless terminal 10, processing for the corresponding communication begins within the wireless terminal 10 at step 96.

Figure 7:
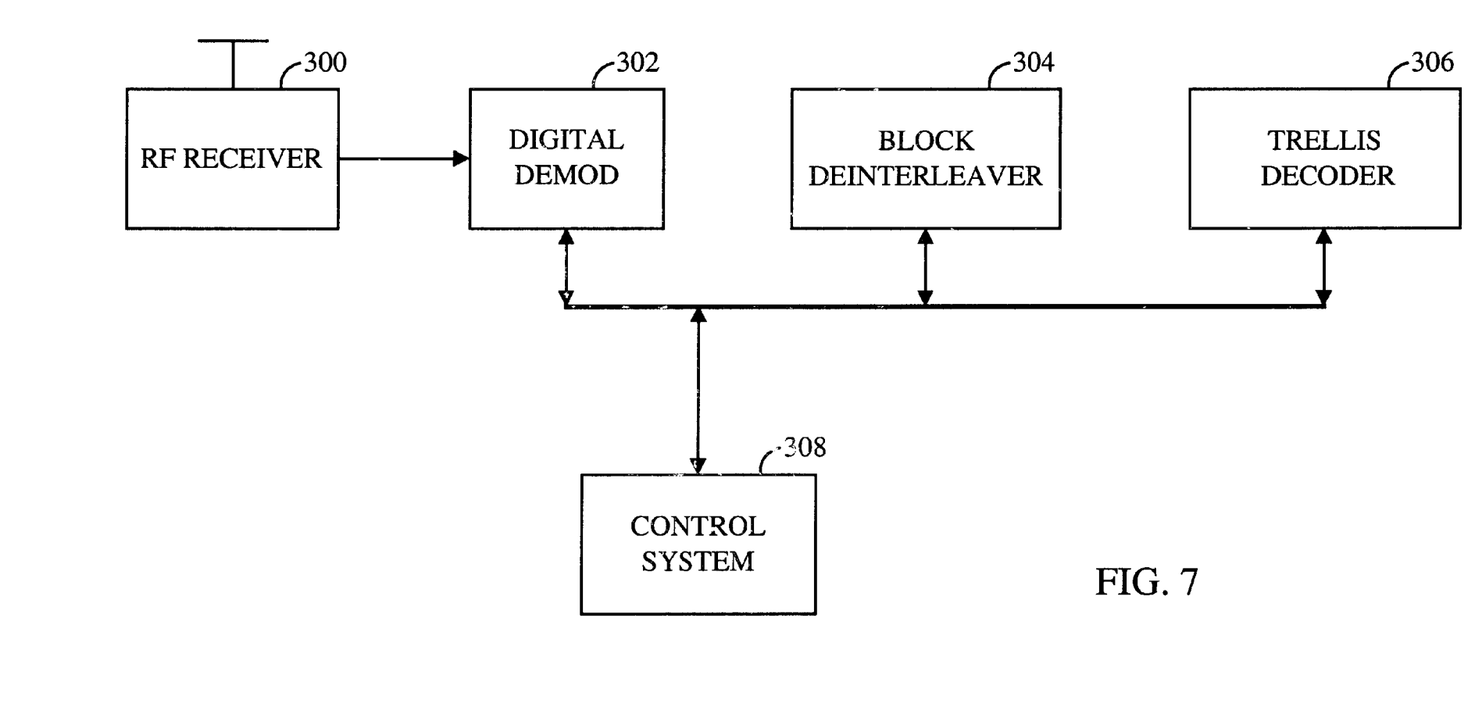
FIG. 7 is a block diagram of a receiver used for receiving pages, in accordance with the present invention.

FIG. 7 is a block diagram showing a simplified illustration of wireless terminal 10 configured in accordance with one embodiment of the invention. Digital demodulator 302, block interleaver 304, trellis decoder 306 and control system 308 are coupled via a digital bus, and RF receiver 300 is coupled to digital demodulator 302. During standby mode, the control system 308 periodically activates RF receiver 300 and digital demodulator 302 to process the pilot and quick paging channels. RF receiver 300 downconverts and digitizes RF signals and digital demodulator 302 performs digital demodulation for a first duration generating soft decision data for the channels being processed. Control system 308 examines the pilot channel soft decision data to determine the quality of the signal and examines the quick paging channel to determine if a quick page message has been received. If a quick page message has been received, or if the signal has been received with poor quality, control system 308 activates block deinterleaver 304 and trellis decoder 306 to begin processing the full paging channel for a second duration that is longer than the first duration. Control system 308 then monitors the data received over the full paging channel for a full paging message directed to it, and if none is detected, deactivates block deinterleaver 304 and trellis decoder 306 and returns to the standby mode. If a full page message is detected, control system 308 places initiates a communication (step 96 in FIG. 5) between wireless terminal 10 and one or more base stations.

As should be apparent from the description provided above, the present invention allows a wireless terminal 10 to consume less power when monitoring for page messages during standby mode using a quick paging message. Consuming less power in standby mode allows wireless terminal 10 to operate longer on a battery charge and therefore extends the standby time of wireless terminal 10. Since wireless terminals 10 are typically used in mobile telecommunications, it is often necessary to go extended periods of time without recharging or replacing the battery of wireless terminal 10. Thus, in order to provide increased convenience, and to reduce the likelihood of missing paging messages due to battery depletion, extending the standby time for a given battery size is highly desirable.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A quick paging system having a base station, a plurality of terminals, and a full paging channel having a plurality of slots for transmitting paging information to the terminals, comprising:

a quick paging channel having a plurality of quick paging channel slots each corresponding to a full paging channel slot;

at least one indicator positioned within a selected quick paging channel slot that instructs at least one selected terminal corresponding to the at least one indicator in the quick paging slot to monitor the corresponding full paging channel slot; wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

2. The quick paging system of claim 1, wherein an absence of the indicator instructs the selected terminal not to monitor the full paging channel slot.

3. The quick paging system of claim 1, wherein the at least one indicator comprises a single bit for instructing the selected terminal to monitor the full paging channel slot.

4. The quick paging system of claim 1, including an identification number associated with the selected terminal wherein the hashing function is applied to the identification number.

5. The quick paging system of claim 1, wherein each of the quick paging channel slots is divided into a plurality of subslots, each of the subslots includes a plurality of indicator positions, a first indicator is disposed within a first indicator position of a first subslot.

6. The quick paging system of claim 5, wherein and a second indicator is disposed within a second indicator position of a second subslot.

7. The quick paging system of claim 6, wherein the first and second indicator positions are selected according to a hash function applied to a time value.

8. The quick paging system of claim 6, wherein the location of the first indicator position within the first subslot differs from the location of the second indicator position within the second subslot.

9. The quick paging system of claim 1, wherein a presence of the indicator is detected by comparing a power level of the quick paging channel with a threshold value.

10. The quick paging system of claim 9, including a pilot channel wherein the threshold value is determined according to a power level of the pilot channel.

11. The quick paging system of claim 1, wherein the paging information is located in a selected paging channel slot on the full paging channel and the quick paging channel slot and the selected paging slot on the full paging channel are offset in time with respect to each other.

12. The quick paging system of claim 1, wherein a location of an indicator in a predetermined subslot of the selected quick paging channel slot is prohibited in order to provide a minimum amount of time between the indicator and any paging information transmitted to the selected terminal.

13. The quick paging system of claim 1, wherein a determination is made of the reliability of the detection of the indicator and the indicator is erased according to the determination.

14. The quick paging system of claim 13, including a pilot channel wherein the reliability determination is made according to a power level present in the pilot channel.

15. The quick paging system of claim 1, wherein an indicator position is reserved for an indicator instructing all terminals of the plurality of terminals to monitor the full paging channel.

16. The quick paging system of claim 1, wherein an indicator position is reserved for an indicator instructing all terminals of the plurality of terminals not to monitor the full paging channel.

17. The quick paging system of claim 1, wherein the indicator is modulated in the quick paging channel using on-off keying.

18. The quick paging system of claim 1, wherein the selected terminal remains in a standby mode until at least one indicator within the message position of the selected quick paging channel slot is received by the selected terminal.

19. The quick paging system of claim 1, wherein the selected quick paging channel slot includes a multi-bit message packet.

20. The quick paging system of claim 19, wherein the multi-bit message packet contains a message instructing all terminals in the plurality of terminals to monitor the full paging channel.

21. The quick paging system of claim 1, wherein the multi-bit message packet contains a message instructing all terminals in the plurality of terminals not to monitor the full paging channel.

22. A communication system having at least one base station and at least one remote station, wherein said at least one base station transmits messages in slots of a full paging channel and said at least one remote station monitoring predetermined slots of said full paging channel for messages intended therefor, said communication system further comprising said at least one base station transmitting indicators in slots of a quick paging channel wherein said at least one remote station monitors predetermined indicators in predetermined quick paging channel slot and responsive thereto for monitoring a predetermined slot on said paging channel; wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

23. A base station for station transmitting messages in slots of a full paging channel further comprising a quick paging channel in which indicators in slots of a quick paging channel are transmitted wherein said at least one remote station monitors predetermined indicators in predetermined quick paging channel slot and responsive thereto for monitoring a predetermined slot on said paging channel;
wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

24. A communication system having at least one base station and at least one remote station, wherein said at least one base station transmits messages in slots of a full paging channel and said at least one remote station monitoring predetermined slots of said full paging channel for messages intended therefor, said at least one base station transmitting indicators in slots of a quick paging channel, said communication system further comprising said at least one remote station monitors predetermined indicators in predetermined quick paging channel slot and responsive thereto for monitoring a predetermined slot on said paging channel;
wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

25. A remote station for monitoring predetermined slots of a base station transmitted full paging channel for messages intended therefor, said remote station further comprising a quick paging channel monitor for monitoring predetermined indicators in predetermined slots of a quick paging channel and responsive thereto for monitoring a predetermined slot on said paging channel; wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

26. In a quick paging system having a base station, a plurality of terminals, and a full paging channel for transmitting paging information to the terminals, a method for paging a terminal, comprising the steps of:
transmitting terminal specific indicators in terminal specific positions in slots of a quick paging channel; and
monitoring at a terminal respective terminal specific positions for terminal specific indicators in predetermined slots of said quick paging channel; and
monitoring at each terminal in response to a detection of terminal specific indicators said full paging channel; wherein said quick paging channel is modulated using on-off keying modulated direct sequence spread spectrum; wherein the least one indicator is placed at selected positions within said quick paging channel slot which are determined from a plurality of positions within the selected quick paging channel slot according to a time value, wherein the selected positions are determined by applying a hashing function to the time value.

\* \* \* \* \*